(12) United States Patent
Huang

(10) Patent No.: US 8,327,549 B2
(45) Date of Patent: Dec. 11, 2012

(54) GARDEN SHEARS

(75) Inventor: Yao-Chung Huang, Fu Shing Hsiang (TW)

(73) Assignee: Ho Cheng Garden Tools Co., Ltd., Chang Hua Hsien (TW)

( * ) Notice: Subject to any disclaimer, the term of this patent is extended or adjusted under 35 U.S.C. 154(b) by 307 days.

(21) Appl. No.: 12/882,199

(22) Filed: Sep. 15, 2010

(65) Prior Publication Data
US 2012/0060377 A1    Mar. 15, 2012

(51) Int. Cl.
*B26B 13/00* (2006.01)
*B26B 17/00* (2006.01)

(52) U.S. Cl. ............... 30/251; 30/190; 30/192; 30/245

(58) Field of Classification Search .............. 30/131, 30/173, 186–188, 190–194, 244, 245, 249–252, 30/254, 260, 266, 267
See application file for complete search history.

(56) References Cited

U.S. PATENT DOCUMENTS

| | | | |
|---|---|---|---|
| 1,915,404 A * | 6/1933 | Clifton | 81/365 |
| 5,544,416 A * | 8/1996 | Lin | 30/193 |
| 5,689,888 A * | 11/1997 | Linden | 30/250 |
| 6,345,446 B1 * | 2/2002 | Huang | 30/250 |
| 8,225,513 B2 * | 7/2012 | Huang | 30/254 |
| 2010/0162575 A1 * | 7/2010 | Lin | 30/245 |
| 2010/0269357 A1 * | 10/2010 | Shan | 30/254 |
| 2011/0126415 A1 * | 6/2011 | Huang | 30/254 |

* cited by examiner

*Primary Examiner* — Phong Nguyen

(57) ABSTRACT

A garden shears has a main cutting member, a minor cutting member, two applying arms, and two assembling members. The major and minor cutting members both have a first pivot aperture and an extended section. An end of each extended section is bent up to form an L-shaped pawl forming a first indentation; an arced limiting slot is adjacent to each first pivot, and a tool end is respectively formed at an opposite end of the major and minor cutting members. Each applying arm has a handle and an assembling portion, each assembling portion having a second pivot aperture and a second indentation. A top edge of each second indentation has driving teeth that respectively engage with the L-shaped pawls of the major and minor cutting members. Each assembling member has a third pivot aperture and two fourth pivot apertures corresponding to the first pivot apertures and the second pivot apertures.

5 Claims, 9 Drawing Sheets

GARDEN SHEARS

BACKGROUND OF THE INVENTION

1. Field of the Invention

The present invention relates to garden shears, and more particularly to a garden shears that is capable of limiting a maximum opening range and that requires less operational strength.

2. Description of the Related Art

More and more people enjoy having plants in their living environment; therefore, garden tools are becoming increasingly popular. Garden shears are used for trimming plants. Please refer to FIG. 8. A prior art garden shears has a metal lever 60, a first member 70 and a second member 80. The metal lever 60 has a first pivot joint 61, a blade 62 and an arm 63 having a second pivot joint 64. The second pivot joint 64 and the first pivot joint 61 are separated from each other by a predetermined distance. The first member 70 is pivoted onto the first pivot joint 61 and connected to the metal bar lever. The first member 70 further has an extended jaw 71 coupled with the blade 62 and is able to cut an object placed in a space formed by the extended jaw 71. The first member 70 further has an extended arm 72 and a first fan-shaped gear 73 disposed between the extended jaw 71 and the extended arm 72. The second member 80 has an extending portion 81 and a second fan-shaped gear 82. The second member 80 is pivoted onto the second pivot joint 64 and connected to the metal lever 60 such that the first and second fan-shaped gears 73, 82 are engaged with each other for relative movement.

However, the prior art structure has the following drawbacks: 1. The first member 70 and the second member 80 are both disposed on the same side of the metal lever 60; when the cutting motion is performed and a counterforce is generated, the counterforce is concentrated at the engaging area of the first member 70 and the second member 80 and is not evenly dispersed over both sides; therefore, the cutting motion is affected by the unbalanced stresses and is made more difficult. 2. The first member 70 and the second member 80 are simply pivoted together and are unable to restrict each other. Therefore, when the first and second members 70, 80 are respectively rotated in opposite directions during the cutting operation, the first and second members 70, 80 can easily become accidentally separated by a maximum angle, which is not usable because the blade 62 requires a proper cutting angle between the object. Furthermore, when the first and second members 70, 80 are too far apart, more effort is required to close them which is very inconvenient for users.

Therefore, it is desirable to provide an improved garden shears to mitigate and/or obviate the aforementioned problems.

SUMMARY OF THE INVENTION

An objective of the present invention is to provide an improved reflective structure.

Another objective of the present invention is to provide an improved reflective structure that is relatively thinner and capable of covering the entire object surface for better reflection effects.

Another objective of the present invention is to provide an improved reflective structure that can improve the safety of the bicycle for riders at night.

In order to achieve the above-mentioned objectives, a garden shears comprises a main cutting member, a minor cutting member, two applying arms, and the two assembling members, all of which are assembled together by at least one nut and screw. The main cutting member and the minor cutting member have corresponding shapes and may overlap each other, and the major and minor cutting members both have a first pivot aperture at a middle position and an extended section. An end of each extended sections is bent up to form an L-shaped pawl forming a first indentation. An arced limiting slot adjacent to each first pivot aperture is respectively formed above the extended section, and a tool end is respectively formed at an opposite end of the major and minor cutting members. Moreover, the tool ends can be an anvil and a blade or both can be anvils. Each applying arm has a handle at a lower portion and an assembling portion at un upper portion; each assembling portion has a second pivot aperture at one end and a second indentation at another end, and a top edge of each of the second indentations has driving teeth for engaging with the L-shaped pawl of the major and minor cutting members. Each assembling member has a third pivot aperture and two fourth pivot apertures corresponding to the first pivot apertures of the major and minor cutting members and the second pivot apertures of the applying arms. The third pivot aperture and the two fourth pivot apertures of the assembling members are arranged in a triangular shape, and one of the third pivot apertures of an assembling member is an oval-shaped aperture, which is capable of accepting an engaging portion of the screw. Therefore, when the major and minor cutting members are opened apart from each other, engaging portion of the screw prevents the screw from disengaging.

With the above-mentioned garden shears, the following benefits can be obtained: 1. The major and minor cutting members both respectively have an applying arm; when a counterforce is generated because of the applied force, the counterforce is evenly distributed across the applying arm instead of being concentrated on a single side, which would otherwise create difficulties in operation. 2. Since the screws move along the limiting slots a maximum opening angle between the tool ends is limited; the user does need to waste time to close the tool ends. Furthermore, the range of the limiting slots corresponds to the usable range of the garden shears, so that the tool ends are not separated by too narrow an angle, which would otherwise lead to difficulties in operation. 3. Each of the major and minor cutting members is engaged with one applying arm, such that it is easy to operate and the application force is evenly distributed on both sides.

Other objects, advantages, and novel features of the invention will become more apparent from the following detailed description when taken in conjunction with the accompanying drawings.

DETAILED DESCRIPTION OF THE PREFERRED
EMBODIMENT

Figure 1:
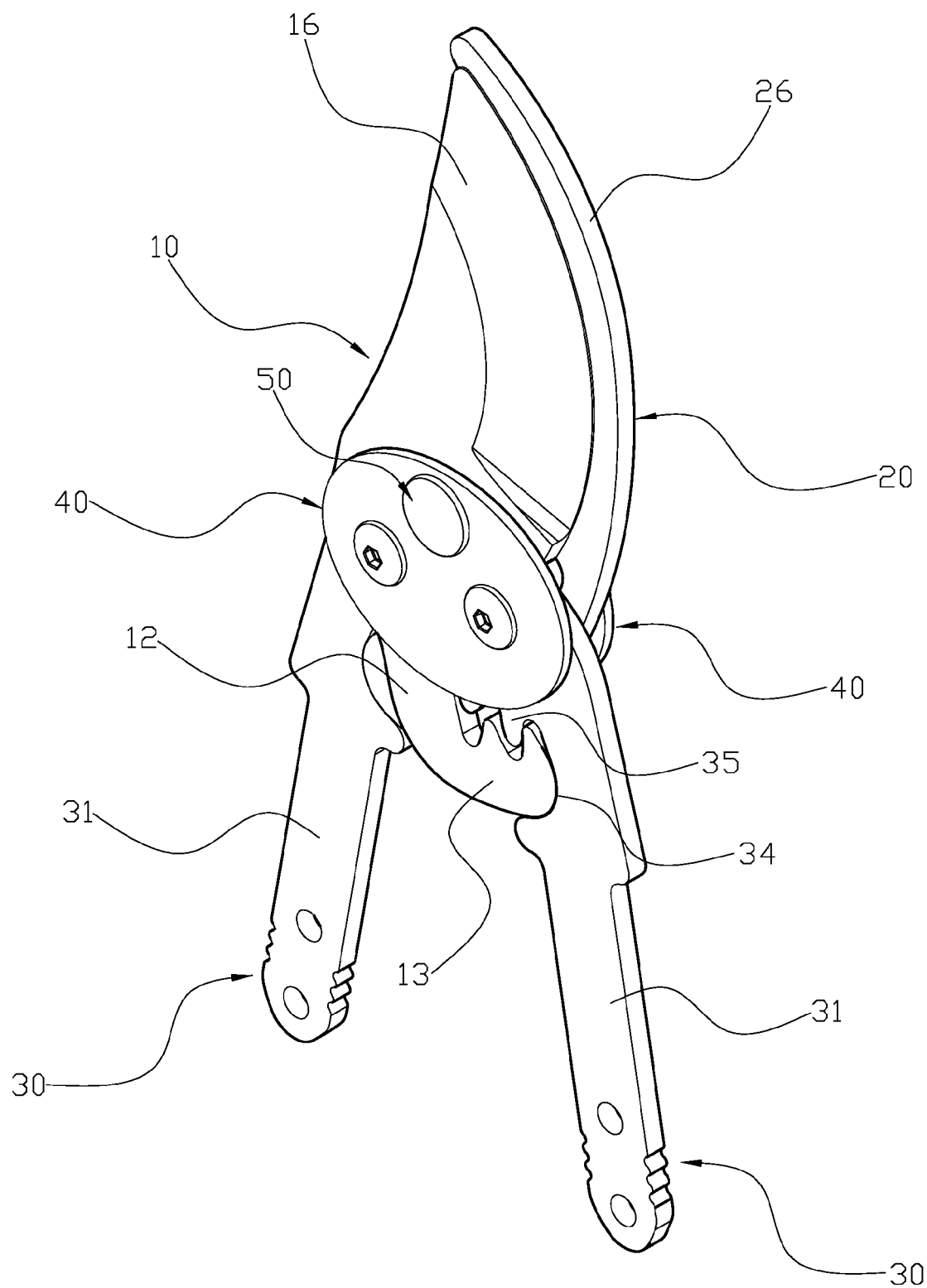
FIG. 1 is a perspective view of an embodiment of the present invention.
Figure 2:
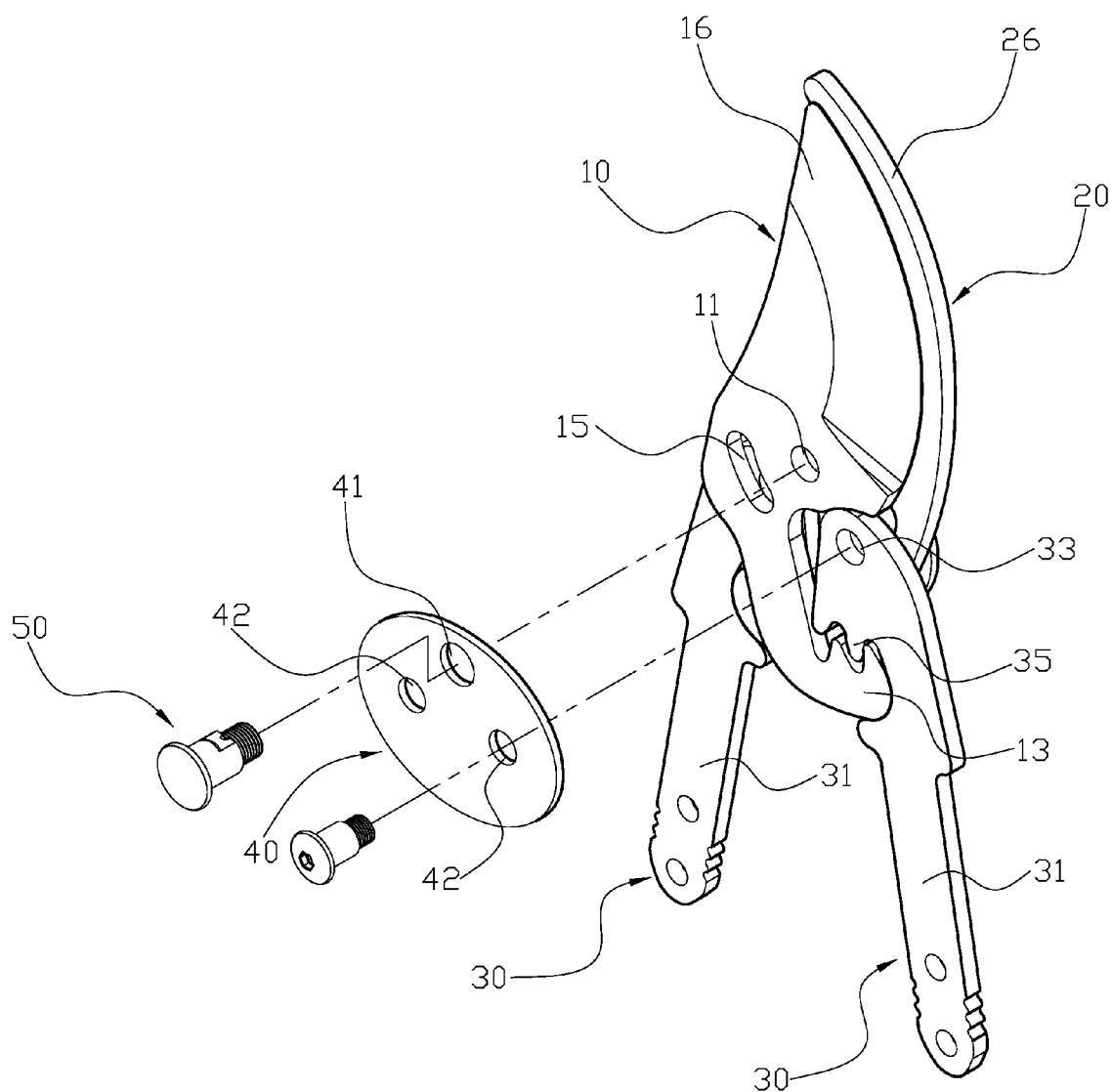
FIG. 2 is a partial exploded view of an embodiment of the present invention.
Figure 3:
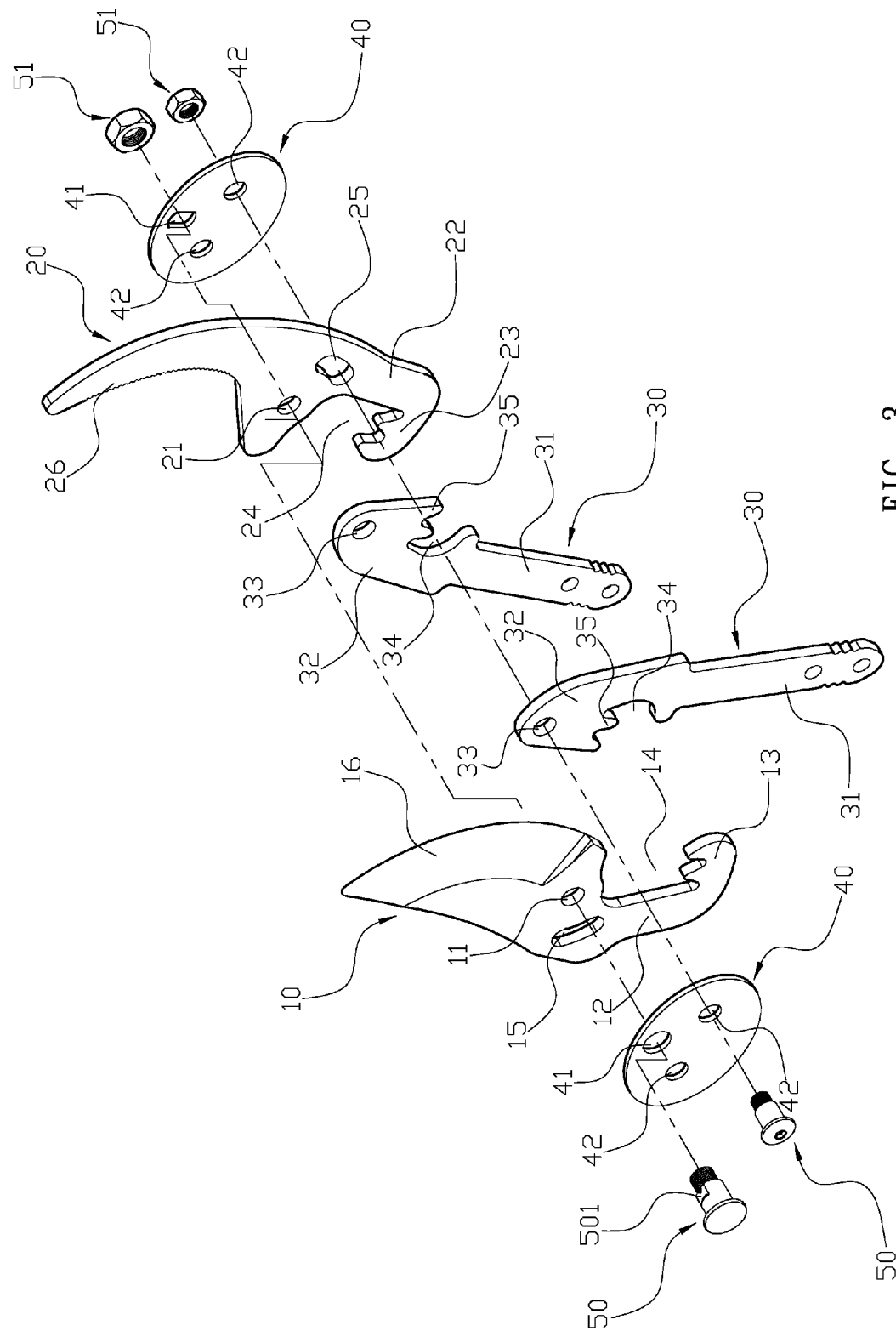
FIG. 3 is a perspective exploded view of an embodiment of the present invention.

Please refer to FIG. 1, FIG. 2 and FIG. 3. A shears comprises a main cutting member 10, a minor cutting member 20, two applying arms 30, and the two assembling members 40, all of which are assembled together by at least one nut 51 and screw 50. The main cutting member 10 and the minor cutting member 20 have corresponding shapes and may overlap each other, and the major and minor cutting members both have a first pivot aperture 11, 21 at a middle position and an extended section 12, 22. An end of each extended sections 12, 22 is bent up to form an L-shaped pawl 13, 23 forming a first indentation 14, 24. An arced limiting slot 15, 25 adjacent to each first pivot aperture 11, 21 is respectively formed above the extended section 12, 22, and a tool end 16, 26 is respectively formed at an opposite end of the major and minor cutting members 10, 20. Moreover, the tool ends 16, 26 can be an anvil and a blade or both can be anvils. Each applying arm 30 has a handle 31 at a lower portion and an assembling portion 32 at un upper portion; each assembling portion 32 has a second pivot aperture 33 at one end and a second indentation 34 at another end, and a top edge of each of the second indentations 34 has driving teeth 35 for engaging with the L-shaped pawl 13, 23 of the major and minor cutting members 10, 20. Each assembling member 40 has a third pivot aperture 41 and two fourth pivot apertures 42 corresponding to the first pivot apertures 11, 21 of the major and minor cutting members 10, 20 and the second pivot apertures 33 of the applying arms 30. The third pivot aperture 41 and the two fourth pivot apertures 42 of the assembling members 40 are arranged in a triangular shape, and one of the third pivot apertures 41 of an assembling member 40 is an oval-shaped aperture, which is capable of accepting an engaging portion 501 of the screw 50. Therefore, when the major and minor cutting members 10, 20 are opened apart from each other, engaging portion 501 of the screw 50 prevents the screw 50 from disengaging.

Figure 4:
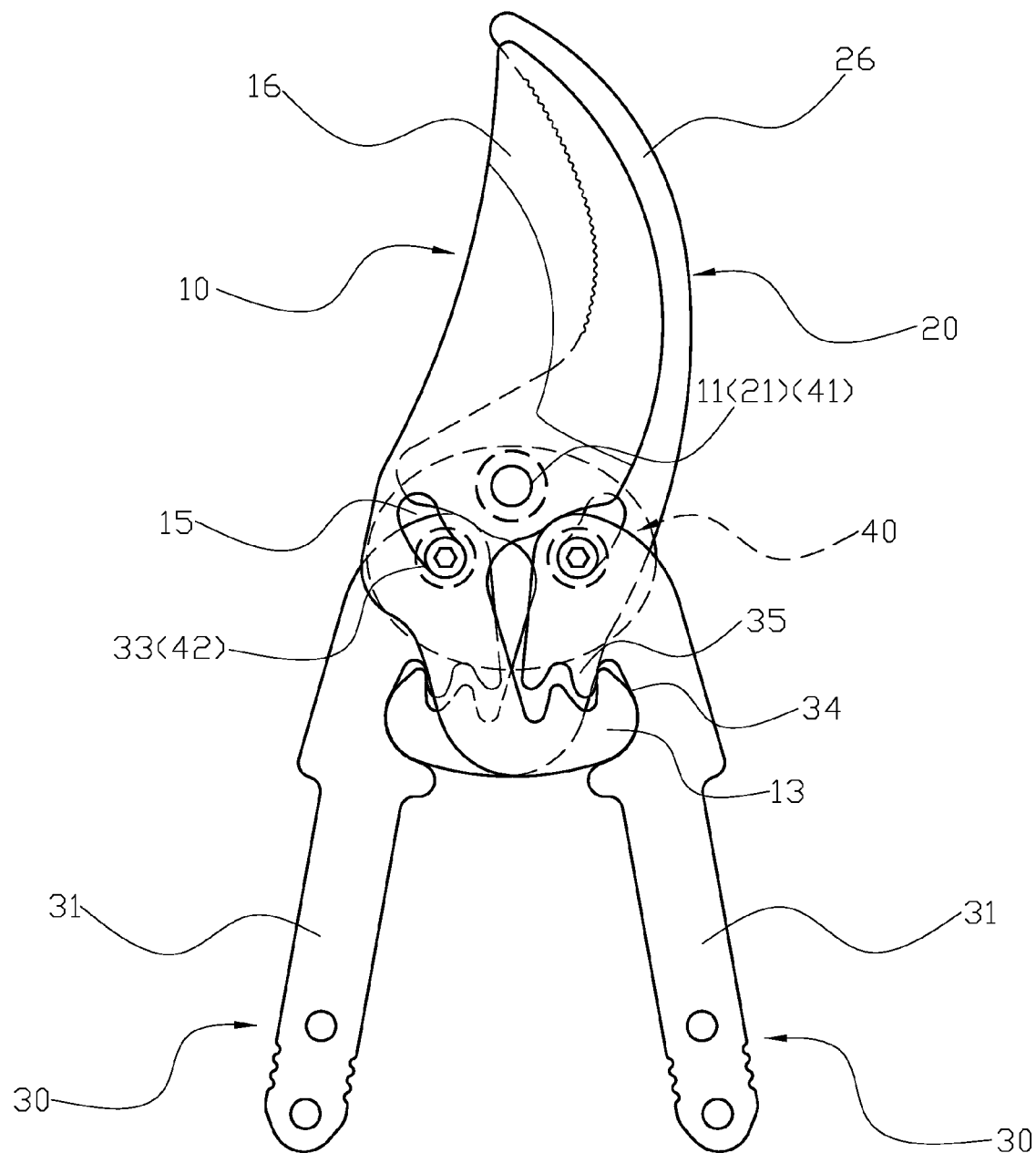
FIG. 4 is a schematic drawing of an embodiment of the present invention.

Furthermore, please refer FIG. 1, FIG. 2 and FIG. 4. The first pivot apertures 11, 21 of the main cutting member 10 and the minor cutting member 20 are aligned with each other and with the second indentations 34 of the two applying arms 30. The two assembling portions 32 are respectively placed in the first indentations 14, 24 of the major and minor cutting members 10, 20 and the driving teeth 35 are respectively engaged with the L-shaped pawls 23 of the major and minor cutting members 10, 20. The second pivot apertures 33 of the two applying arms 30 are respectively aligned with the limiting slots 15, 25 of the major and minor cutting members 10, 20. The third pivot apertures 41 of the two assembling members 40 are aligned with the first pivot apertures 11, 21 of the major and minor cutting members 10, 20, and the two assembling members 40 cover the applying arms 30 and the major and minor cutting members 10, 20. The screw 50 passes through the third pivot aperture 41 of each of the two assembling members 40, and through the first pivot apertures 11, 21 of the main and minor cutting members 10, 20, and is locked by a nut. Two screws 50 respectively pass through the fourth pivot apertures 42 of the assembling members 40, the limiting slots 15, 25 of the major and minor cutting members 10, 20 and the second pivot apertures 33 of the applying arms 30 and are respectively locked by two nuts. Therefore, the main cutting member 10 and the minor cutting member 20 utilize the screws 50 to move along the limiting slots 15, 25.

Figure 5:
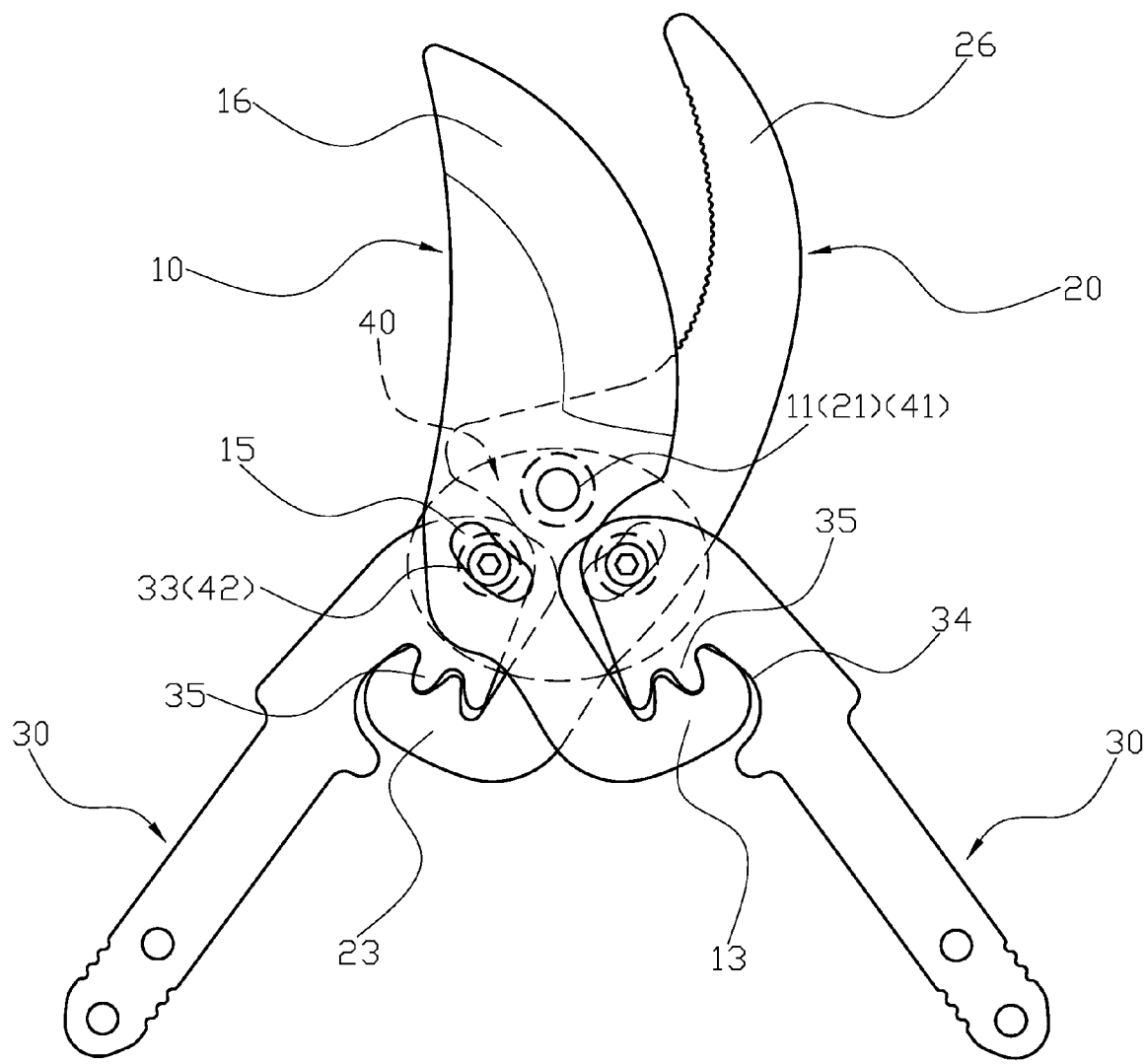
FIG. 5 is a schematic drawing showing tool ends being opened.
Figure 6:
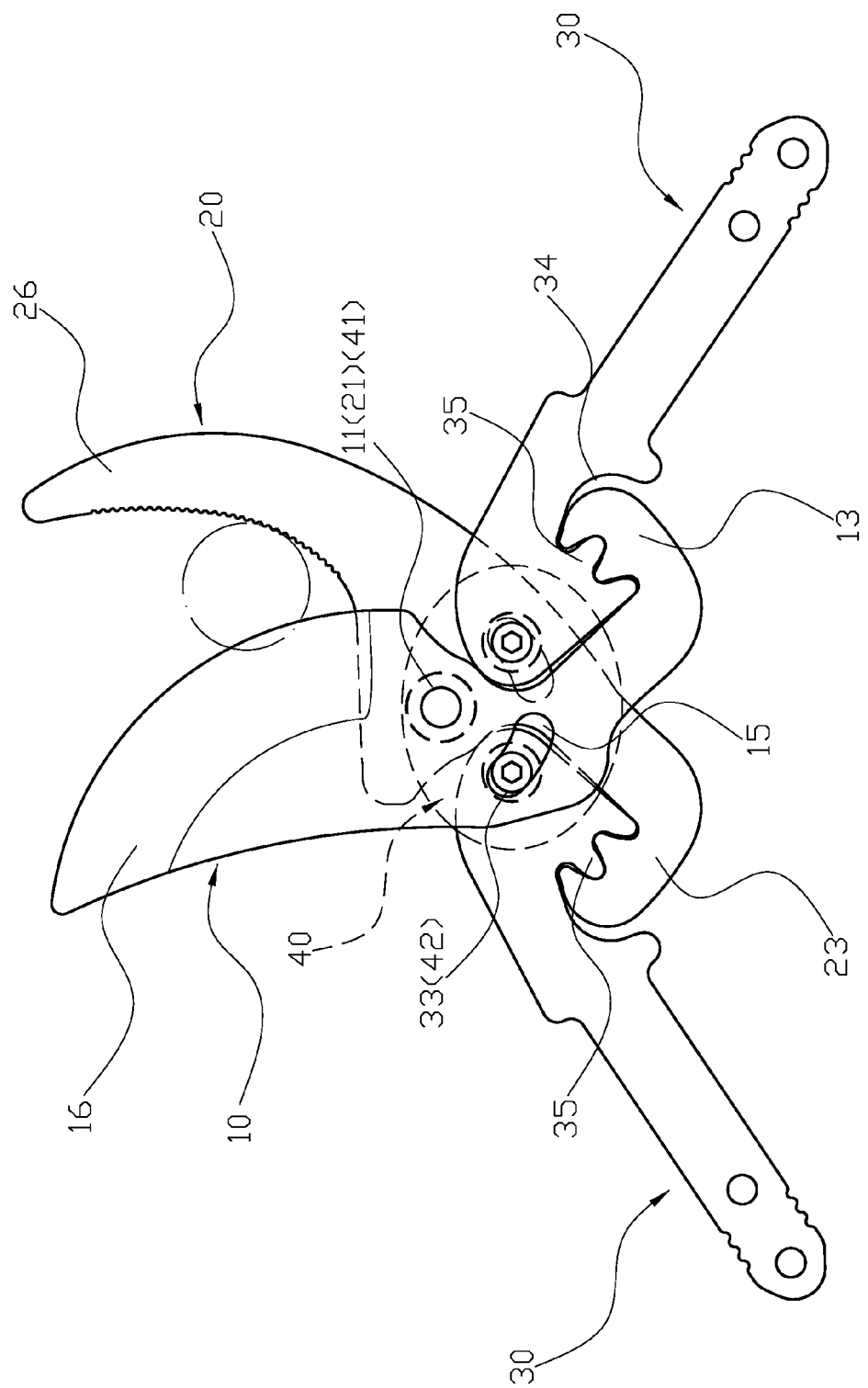
FIG. 6 is a schematic drawing showing tool ends being opened to a maximum range.

In operation, the main cutting member 10 and the minor cutting member 20 both pivot around first pivot apertures 11, 21, and the paired handles 31 of the two applying arms 30 are both able to be forced opened. When the main cutting member 10 and the paired handles 31 of the two applying arms 30 are forced to open around the first and second pivot apertures 11, 21, the screws 50 passing through the second pivot apertures 33 of the applying arm 30 are able to move along the respective limiting slots 15, 25. When the applying arms 30 are opened wider and wider, the major and minor cutting members 10, 20 are driven apart from the tool end 16, 26 due to the engagement between the L-shaped pawls 13, 23 and the driving teeth 35. Please refer to FIG. 5 and FIG. 6. The separated tool ends 16, 26 can be used for cutting objects with an external force applied in opposite directions. Since the screws 50 move along the limiting slots 15, 25, an opening angle between the tool ends 16, 26 is limited to a maximum value. Therefore, the user does need to waste time to close the tool ends 16, 26. The first pivot apertures 11, 21, the third pivot apertures 41, the two second pivot apertures 33, and the fourth pivot apertures 42 provide multiple pivoting points, which distribute the applied strength. Moreover, when the handles 31 are opened into a relatively large angle, the tool ends 16, 26 are only correspondingly opened across a relatively small angle, and therefore the application strength is more efficient. In addition, each of the major and minor cutting members 10, 20 is engaged with one applying arm 30, such that it is easy to operate and the application force is evenly distributed on both sides.

Figure 7:
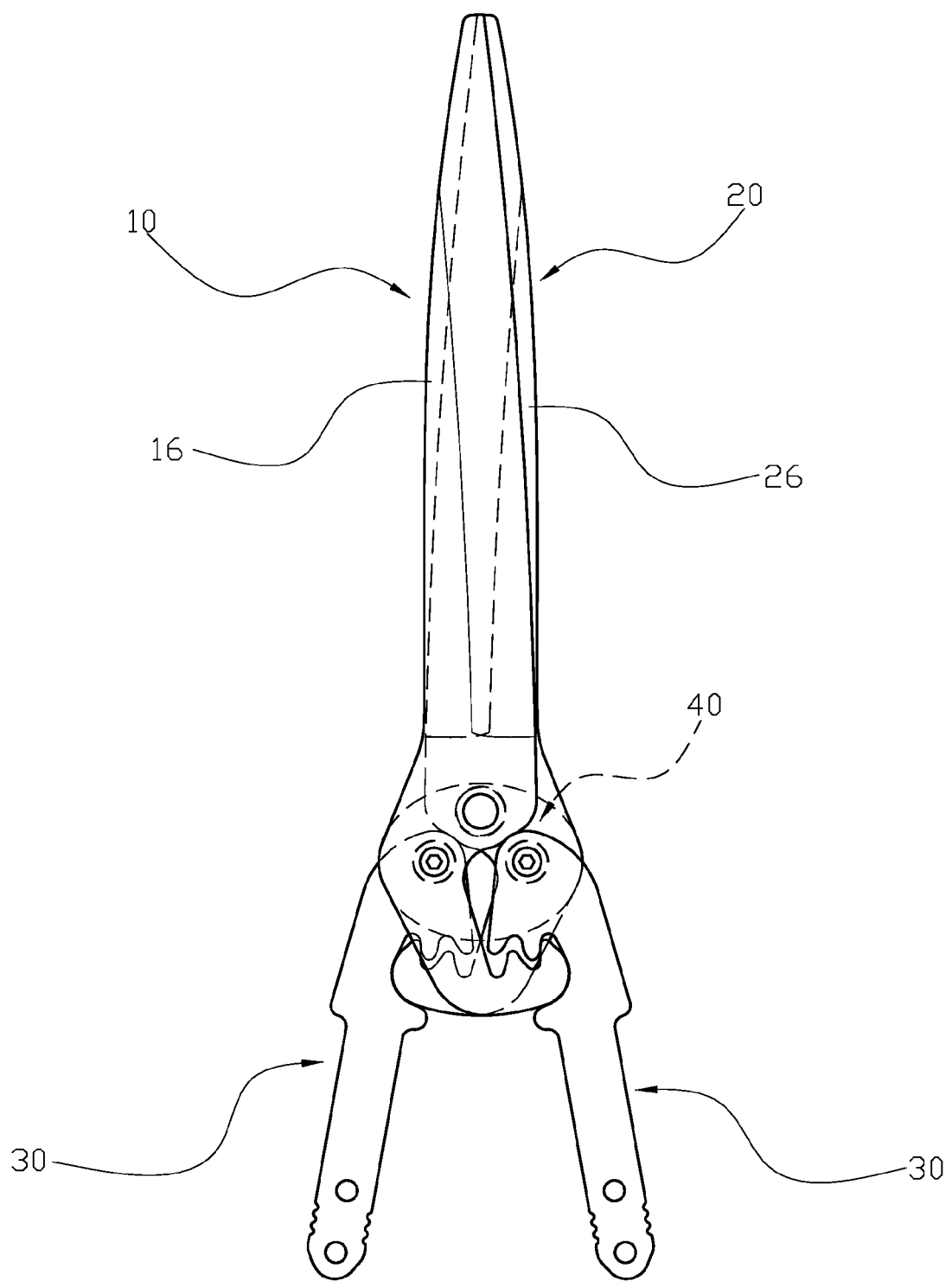
FIG. 7 is a schematic drawing of another embodiment of the present invention.
Figure 8:
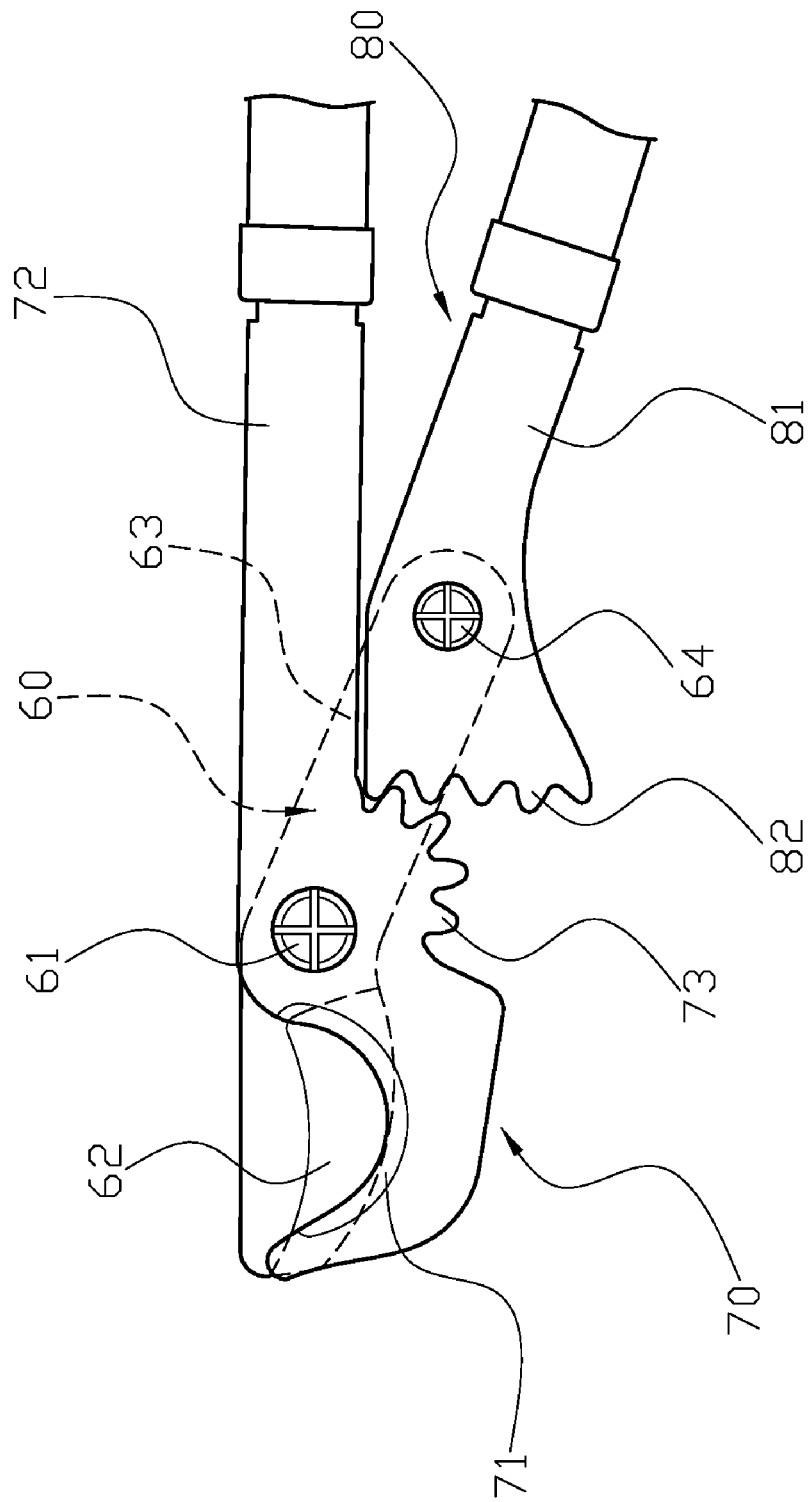
FIG. 8 is a schematic drawing of a prior art shears.
Figure 9:
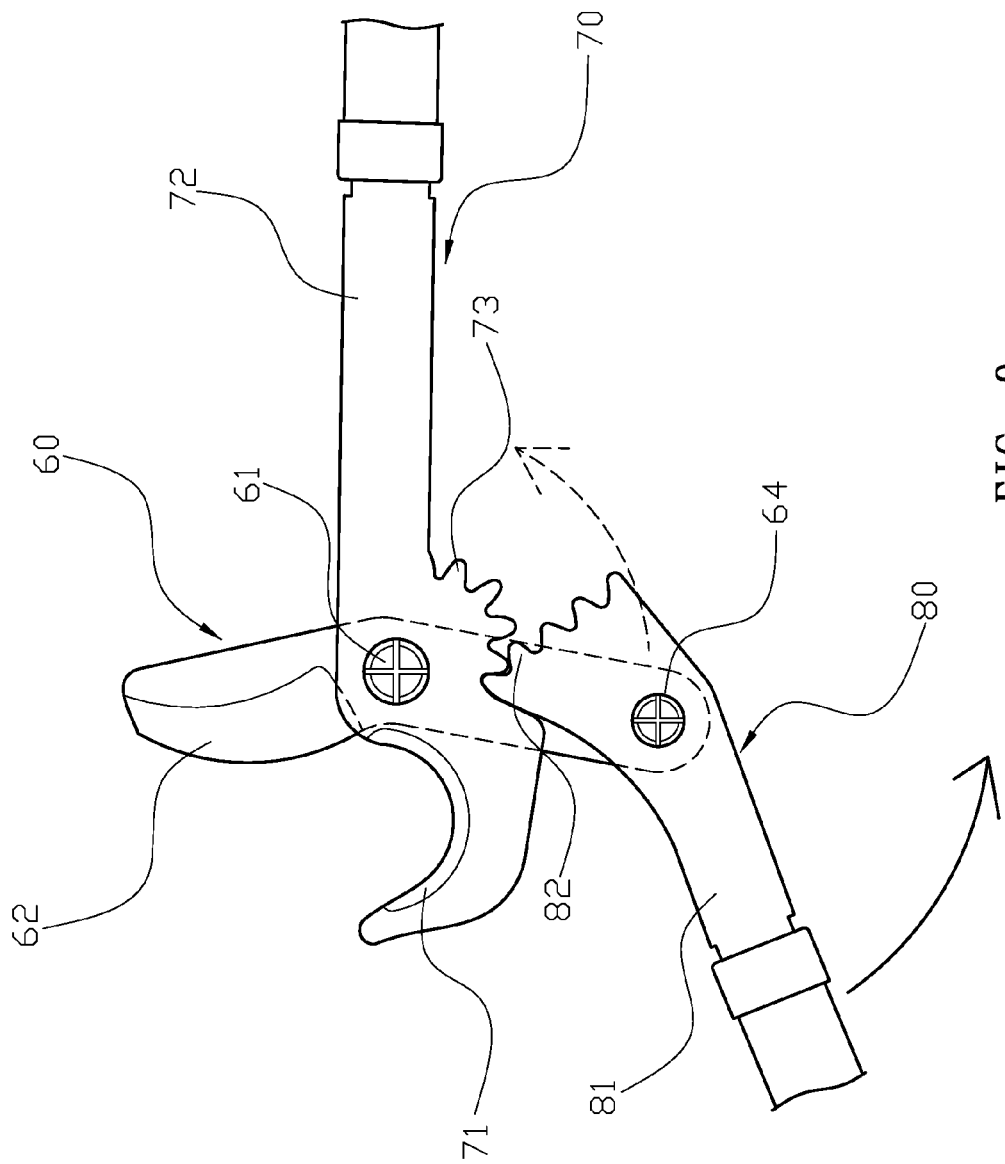
FIG. 9 is a usage schematic drawing of the prior art.

Please refer again to FIG. 1 to FIG. 6 together with FIG. 7. The tool ends 16, 26 can be arranged in two different combinations, as shown in FIG. 1 to FIG. 6. One can provide a cutting edge while the other provides an anvil or pressing surface; alternatively, both cutting portions 14, 26 may provide cutting surfaces, as shown in FIG. 7.

With the above-mentioned garden shears, the following benefits can be obtained: 1. The major and minor cutting members 10, 20 both respectively have an applying arm 30; when a counterforce is generated because of the applied force, the counterforce is evenly distributed across the applying arm 30 instead of being concentrated on a single side, which would otherwise create difficulties in operation. 2. Since the screws 50 move along the limiting slots 15, 25, a maximum opening angle between the tool ends 16, 26 is limited; the user does need to waste time to close the tool ends 16, 26. Furthermore, the range of the limiting slots 15, 25 corresponds to the usable range of the garden shears, so that the tool ends 16, 26 are not separated by too narrow an angle, which would otherwise lead to difficulties in operation. 3. Each of the major and minor cutting members 10, 20 is engaged with one applying arm 30, such that it is easy to operate and the application force is evenly distributed on both sides.

Although the present invention has been explained in relation to its preferred embodiment, it is to be understood that many other possible modifications and variations can be made without departing from the spirit and scope of the invention as hereinafter claimed.

What is claimed is:

1. A garden shears comprising a major cutting member, a minor cutting member, two applying arms, and two assembling members, all of which are assembled together by at least one nut and screw; wherein:

the major cutting member and the minor cutting member have corresponding shapes and overlap each other, the major and minor cutting members both having a first pivot aperture at a middle position and an extended section, an end of each extended sections bent up to form an L-shaped pawl including a first indentation, an arced limiting slot adjacent to each first pivot aperture formed above the extended section, and a tool end is formed at an opposite end of the major and minor cutting members;

each applying arm has a handle at a lower portion and an assembling portion at un upper portion, each assembling portion having a second pivot aperture at one end and a second indentation at another end, a top edge of the second indentation having driving teeth for engaging with the L-shaped pawl of the major and minor cutting members;

each assembling member has a third pivot aperture and two fourth pivot apertures corresponding to the first pivot apertures of the major and minor cutting members and the second pivot aperture of the applying arm;

wherein the first pivot apertures of the major cutting member and the minor cutting member are aligned with each other and with the second indentations of the two applying arms, the two assembling portions are respectively placed in the first indentations of the major and minor cutting members and the driving teeth are respectively engaged with the L-shaped pawls of the major and minor cutting members, each second pivot aperture of the two applying arms is respectively aligned with the limiting slots of the major and minor cutting members, the third pivot apertures of the two assembling members are aligned with the first pivot apertures the major and minor cutting members and the two assembling members cover the applying arms and the major and minor cutting members, a screw passing through the third pivot aperture of each of the two assembling members, and the first pivot apertures of the major and minor cutting members and locked by a nut, two screws respectively passing through the fourth pivot apertures of the assembling members, the limiting slots of the major and minor cutting members and the second pivot apertures of the applying arms and respectively locked by two nuts.

2. The garden shears as claimed in claim 1, wherein the tool end of the major cutting member is a blade, and the tool end of the minor cutting member is an anvil.

3. The garden shears as claimed in claim 1, wherein the tool end of the major and minor cutting members are blades.

4. The garden shears as claimed in claim 1, wherein the third pivot aperture and the two fourth pivot apertures of the assembling members are arranged in a triangle.

5. The garden shears as claimed in claim 1, wherein one of the third pivot apertures of each assembling member is an oval shape aperture.

* * * * *